(12) United States Patent
Chen (10) Patent No.: US 8,696,852 B2
(45) Date of Patent: Apr. 15, 2014

(54) METHOD OF MAKING BAMBOO-SURFACED LAYERED VENETIAN BLIND SLATS HAVING A CURVED CROSS-SECTION

(75) Inventor: Zeyun Chen, Zhejiang Province (CN)

(73) Assignee: Zhejiang Xueqiang Bamboo & Wood Furniture Co., Ltd, Zhejiang Province (CN)

( * ) Notice: Subject to any disclaimer, the term of this patent is extended or adjusted under 35 U.S.C. 154(b) by 366 days.

(21) Appl. No.: 13/175,950

(22) Filed: Jul. 5, 2011

(65) Prior Publication Data

US 2012/0118432 A1     May 17, 2012

(30) Foreign Application Priority Data

Nov. 16, 2010  (CN) ........................ 2010 1 0551616

(51) Int. Cl.
*B29C 53/04* (2006.01)
*B29C 65/48* (2006.01)
*B32B 21/14* (2006.01)
*E06B 9/386* (2006.01)

(52) U.S. Cl.
USPC ......... 156/196; 156/250; 144/256.3; 144/349

(58) Field of Classification Search
USPC ........ 156/196, 205, 245, 250; 144/256.3, 349
See application file for complete search history.

(56) References Cited

U.S. PATENT DOCUMENTS

| 4,816,103 A * | 3/1989 | Ernest ............................ 156/205 |
| 2009/0117337 A1* | 5/2009 | Chen ............................ 428/174 |

\* cited by examiner

*Primary Examiner* — Michael Tolin (57) ABSTRACT

A method of making bamboo-surfaced layered Venetian blind slats having a curved cross-section comprising (1) selecting bamboo slices each having a length slightly longer than the slats to be made, each having a width which equals the total width of the slats to be made; (2) selecting filling slices, each having a length and width identical to the bamboo slices; (3) selecting an adhesive to adhere a bamboo slice, a filling slice and a bamboo slice to form a layered slat piece; (4) placing the layered slat piece into a mold and compressing the layered slat piece to form a curved plate; (5) cutting along the length of the curved plate to obtain blank slats; (6) trimming the remains of the cutting surfaces and the two end surfaces of the blank slats to obtain the final product.

10 Claims, 8 Drawing Sheets

METHOD OF MAKING BAMBOO-SURFACED LAYERED VENETIAN BLIND SLATS HAVING A CURVED CROSS-SECTION

BACKGROUND OF THE INVENTION

The present invention relates to a method of making bamboo-surfaced Venetian blind slats and more particularly pertains to a method of making bamboo-surfaced layered Venetian blind slats having a curved cross-section.

Owing to the shading, dimmable and well-ventilated effects of Venetian blinds, Venetian blinds are extensively used in offices, hotels, conference rooms and homes.

According to the records of the prior patents, China Patent Nos. CN2756798, CN 2550472 and CN2898252, slats of Venetian blinds were disclosed to be arc-shaped, bow-shaped, S-shaped or wave-shaped. The advantages of having a curved cross-section are that the bending resistance of slats is increased more than two times when compared with slats of the same thickness and materials, and the lifespan of which is significantly increased.

In the prior art, the method of making slats with a curved cross-section is to form each slat by arranging the materials in layers and then compressing the layers together. The disadvantages of the method are that the production efficiency is low, the production cost is high, the energy consumption is high, and the product yield is low.

BRIEF SUMMARY OF THE INVENTION

In view of the aforesaid disadvantages now present in the prior art, the present invention provides a method of making bamboo-surfaced layered Venetian blind slats having a curved cross-section, which can achieve high production efficiency, low production cost, reasonable energy consumption and high product yield.

To attain this, the method of making bamboo-surfaced layered Venetian blind slats having a curved cross-section of the present invention comprises the steps of: (1) selecting bamboo slices, the length of each is slightly longer than that of the slats to be made, the width of each is the total width of a plurality of the slats to be made, the thickness of each is 0.18 mm to 0.42 mm, the longitude of the bamboo slices follows that of the bamboo fibers; (2) selecting filling slices, the length and width of each are identical to those of the bamboo slices, the thickness of each is 0.6 mm to 2.0 mm, the longitude of the filling slices follows that of their fibers; (3) selecting adhesives and using the adhesives to adhere a bamboo slice, a filling slice, a bamboo slice in turn to form a layered slat piece; (4) placing the layered slat piece into a mold with a large surface area which corresponds in size from top to bottom with identical cycle in identical curved shape and is continuously formed, and a curved plate with a large surface area is thus formed from compression; (5) cutting along the longitude of the curved plate with a large surface area to obtain bamboo-surfaced layered Venetian blind blank slats having a curved cross-section; (6) trimming the remains of the cutting surfaces and the two end surfaces of the bamboo-surfaced layered Venetian blind blank slats, and bamboo-surfaced layered Venetian blind slats having a curved cross-section can be obtained.

The bamboo slices in Step (1) can be done by rotary slicing of the raw bamboo or the assembled laminated bamboo material or by plain slicing the assembled laminated bamboo material.

The filling slices in Step (2) can be fast growing wood slices, bamboo slices or synthetic slices.

The adhesives in Step (3) can be wood glue.

The curve of the mold with a large surface area in Step (4) can be an arc, or a wavy, sine, cosine, parabolic or hyperbolic curve.

The cross-section of the bamboo-surfaced layered Venetian blind slats in Step (6) can be arc-shaped, wave-shaped, S-shaped, U-shaped, parabolic-shaped or hyperbolic-shaped.

It is an object of the present invention to provide a method of making bamboo-surfaced layered Venetian blind slats having a curved cross-section, the beneficial effects of which are high production efficiency, low production cost, reasonable energy consumption and high product yield.

DETAILED DESCRIPTION OF THE INVENTION

The present invention is further described in detail with reference to the accompanying drawings and the following embodiments.

Figure 1:
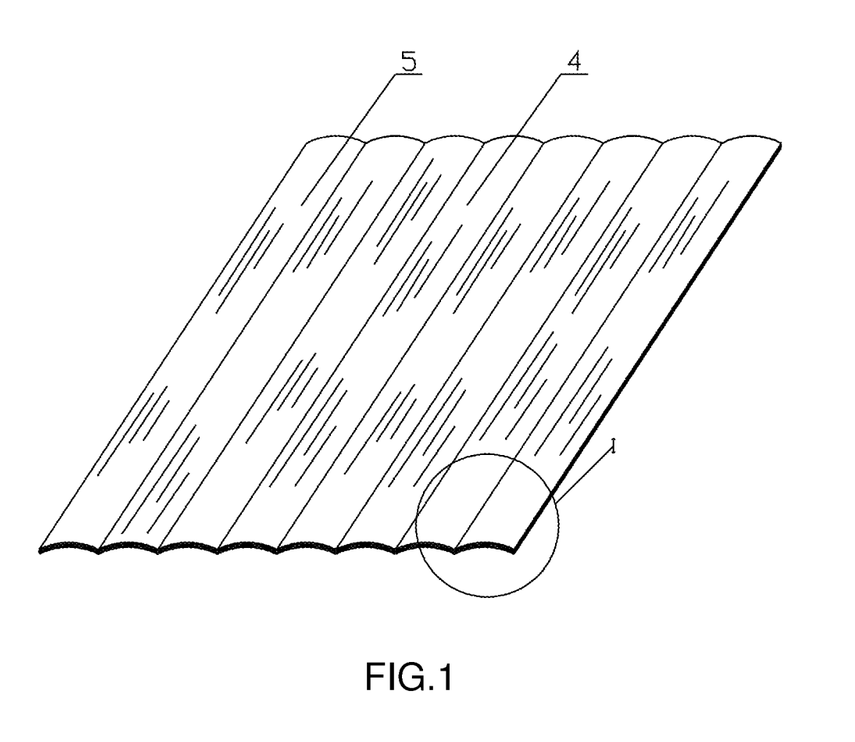
FIG. 1 shows the arc-shaped plate with a large surface area in the method of making bamboo-surfaced layered Venetian blind slats having a curved cross-section of the present invention.
Figure 2:
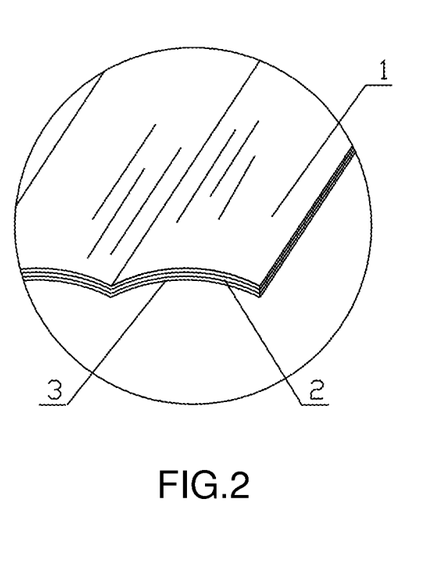
FIG. 2 is the enlarged view of the part marked I in FIG. 1.
Figure 3:
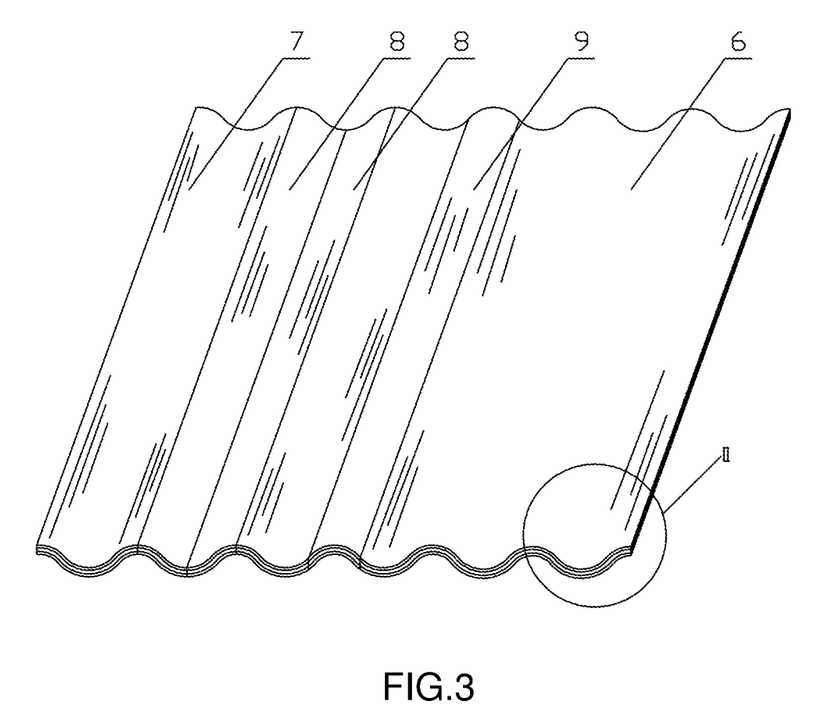
FIG. 3 shows the wave-shaped plate with a large surface area in the method of making bamboo-surfaced layered Venetian blind slats having a curved cross-section of the present invention.
Figure 4:
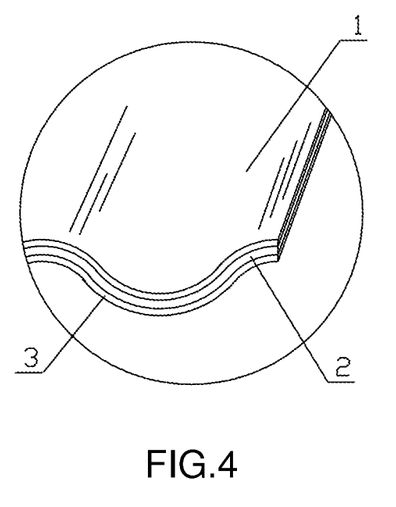
FIG. 4 is the enlarged view of the part marked II in FIG. 3.
Figure 5:
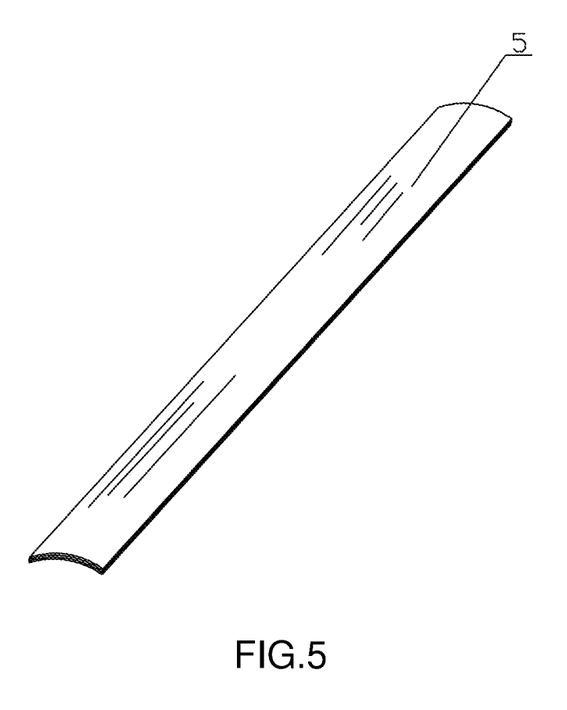
FIG. 5 shows a bamboo-surfaced layered Venetian blind slat having an arc-shaped cross-section obtained by cutting and trimming from the arc-shaped plate with a large surface area in FIG. 1.
Figure 6:
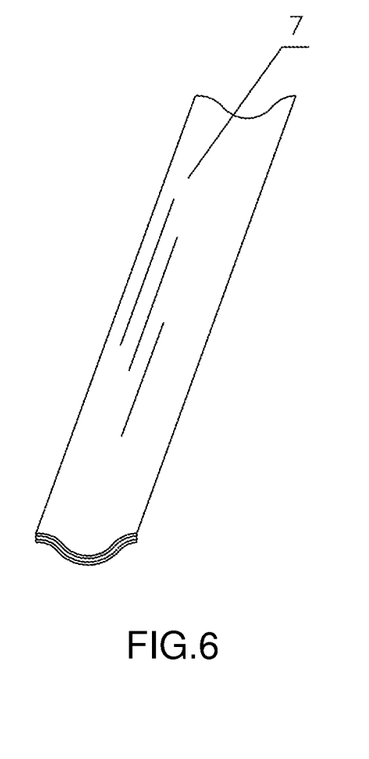
FIG. 6 shows a bamboo-surfaced layered Venetian blind slat having a U-shaped cross-section obtained by cutting and trimming from the wave-shaped plate with a large surface area in FIG. 3.
Figure 7:
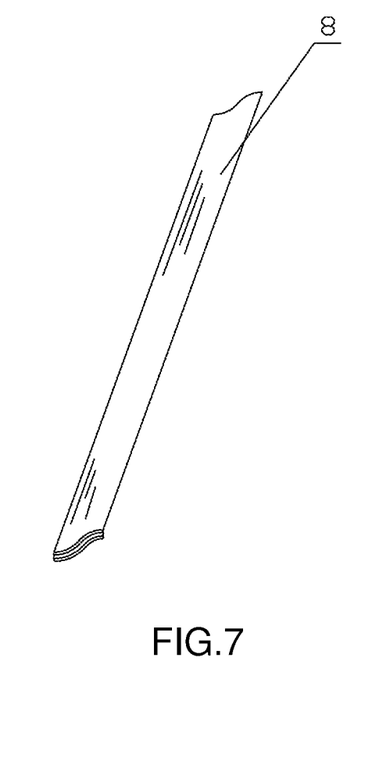
FIG. 7 shows a bamboo-surfaced layered Venetian blind slat having an S-shaped cross-section obtained by cutting and trimming from the wave-shaped plate with a large surface area in FIG. 3.
Figure 8:
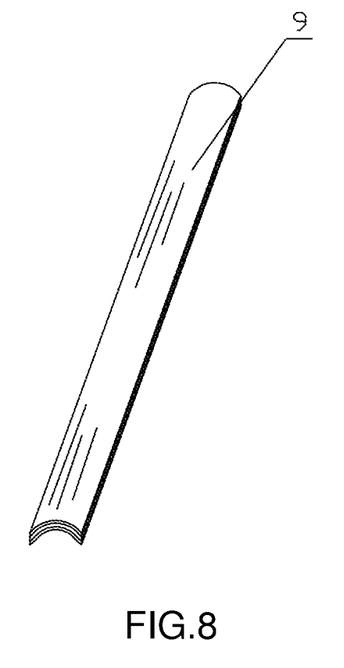
FIG. 8 shows a bamboo-surfaced layered Venetian blind slat having an arc-shaped cross-section obtained by cutting and trimming from the wave-shaped plate with a large surface area in FIG. 3.

In the first embodiment, as illustrated in FIGS. 1, 2 and 5, the method of making bamboo-surfaced layered Venetian blind slats having an arc-shaped cross-section comprises the steps of: (1) selecting bamboo slices 1, 3, the length of which is 2,005 mm, the width of which is 1,000 mm, the thickness of which is 0.2 mm, the longitude of the bamboo slices follows that of the bamboo fibers; (2) selecting fast growing wood slices as filling slices 2, the length and width of which are identical to those of the bamboo slices 1, 3, the thickness of which is 1.8 mm, the longitude of which follows that of their fibers; (3) selecting wood glue as adhesives and using the wood glue to adhere the bamboo slice 3, the filling slice 2, the bamboo slice 1 in turn to form a layered slat piece; (4) placing the layered slat piece into a mold with a large surface area which corresponds in size from top to bottom with identical cycle in identical arc shape and is continuously formed, using steam to control the temperature at 100° C., gluing together by means of hot compression for approximately 30 seconds, taking out and cooling under room temperature, and a continuous arc-shaped plate 4 with a large surface area is thus obtained; (5) cutting along the longitude of the continuous arc-shaped plate 4 with a large surface area to obtain bamboo-surfaced layered Venetian blind blank slats having an arc-shaped cross section; (6) trimming the remains of the cutting surfaces and the two end surfaces of the blind blank slats, and bamboo-surfaced layered Venetian blind slats having an arc-shaped cross-section 5 can be obtained.

In the second embodiment, as illustrated in FIGS. 3, 4, 6, 7 and 8, the method of making bamboo-surfaced layered Venetian blind slats having a wave-shaped cross-section comprises the steps of: (1) selecting bamboo slices 1, 3, the length of which is 2,005 mm, the width of which is 1,000 mm, the thickness of which is 0.3 mm, the longitude of the bamboo slices follows that of the bamboo fibers; (2) selecting bamboo slices as filling slices 2, the length and width of which are identical to those of the bamboo slices 1, 3, the thickness of which is 1.2 mm, the longitude of which follows that of their fibers; (3) selecting wood glue as adhesives and using the wood glue to adhere the bamboo slice 3, the filling slice 2, the bamboo slice 1 in turn to form a layered slat piece; (4) placing the layered slat piece into a mold with a large surface area which corresponds in size from top to bottom with identical cycle in identical wavy shape and is continuously formed, using steam to control the temperature at 100° C., gluing together by means of hot compression for approximately 30 seconds, taking out and cooling under room temperature, and a continuous wave-shaped plate 6 with a large surface area is thus obtained; (5) cutting along the longitude of the continuous wave-shaped plate 4 with a large surface area to obtain bamboo-surfaced layered Venetian blind blank slats having an U-shaped cross section; it is also possible to obtain bamboo-surfaced layered Venetian blind blank slats having an S-shaped cross section, or bamboo-surfaced layered Venetian blind blank slats having an arc-shaped cross section; (6) trimming the remains of the cutting surfaces and the two end surfaces of the blind blank slats, and bamboo-surfaced layered Venetian blind slats having an U-shaped cross-section 7, bamboo-surfaced layered Venetian blind slats having an S-shaped cross-section 8, and bamboo-surfaced layered Venetian blind slats having an arc-shaped cross-section 9 can be obtained.

In the third embodiment, as illustrated in FIGS. 1, 2 and 5, the method of making bamboo-surfaced layered Venetian blind slats having an arc-shaped cross-section comprises the steps of: (1) selecting bamboo slices 1, 3, the length of which is 2,005 mm, the width of which is 1,000 mm, the thickness of which is 0.4 mm, the longitude of the bamboo slices follows that of the bamboo fibers; (2) selecting bamboo slices as filling slices 2, the length and width of which are identical to those of the bamboo slices 1, 3, the thickness of which is 0.8 mm, the longitude of which follows that of their fibers; (3) selecting wood glue as adhesives and using the wood glue to adhere the bamboo slice 3, the filling slice 2, the bamboo slice 1 in turn to form a layered slat piece; (4) placing the layered slat piece into a mold with a large surface area which corresponds in size from top to bottom with identical cycle in identical arc shape and is continuously formed, using steam to control the temperature at 100° C., gluing together by means of hot compression for approximately 30 seconds, taking out and cooling under room temperature, and a continuous arc-shaped plate 4 with a large surface area is thus obtained; (5) cutting along the longitude of the continuous arc-shaped plate 4 with a large surface area to obtain bamboo-surfaced layered Venetian blind blank slats having an arc-shaped cross section; (6) trimming the remains of the cutting surfaces and the two end surfaces of the blind blank slats, and bamboo-surfaced layered Venetian blind slats having an arc-shaped cross-section 5 can be obtained.

The method of making bamboo-surfaced layered Venetian blind slats having a curved cross-section is also applicable in the method of making wood-surfaced layered Venetian blind slats. Any method of placing the bamboo-surfaced or wood-surfaced layered slat piece into a mold with a large surface area which corresponds in size from top to bottom with identical cycle in identical curved shape and is continuously formed, with curved plate with a large surface area being then formed from compression, and with bamboo-surfaced or wood-surfaced layered Venetian blind slats with an arc-shaped cross-section being obtained, falls within the scope of protection of the present invention.

What is claimed is:

1. A method of making bamboo-surfaced layered Venetian blind slats having a curved cross-section comprising the steps of:
    (1) selecting bamboo slices, each having a length which is slightly longer than that of the slats to be made, each having a width which equals the total width of a plurality of the slats to be made, the length of the bamboo slices being parallel to the bamboo fibers;
    (2) selecting filling slices having fibers, each having a length and width which are identical to those of the bamboo slices, the length of the filling slices being parallel to that of their fibers;
    (3) selecting an adhesive and using the adhesive to adhere a bamboo slice, a filling slice, and a bamboo slice in turn to form a layered slat piece, wherein the fibers of each layer are parallel to the length of the layered slat piece;
    (4) placing the layered slat piece into a mold with a large surface area having top and bottom pressing surfaces, the top and bottom pressing surfaces each having a cooperating continuous shape formed from a repeating curved shape, and compressing the layered slat piece in the mold to form a curved plate with a large surface area;
    (5) cutting along the length of the curved plate with a large surface area to obtain bamboo-surfaced layered Venetian blind blank slats having a curved cross-section; and
    (6) trimming the remains of the cutting surfaces and the two end surfaces of the bamboo-surfaced layered Venetian blind blank slats to produce bamboo-surfaced layered Venetian blind slats having a curved cross-section.

2. The method of making bamboo-surfaced layered Venetian blind slats having a curved cross-section as in claim 1, wherein the bamboo slices in Step (1) are made by rotary slicing of raw bamboo.

3. The method of making bamboo-surfaced layered Venetian blind slats having a curved cross-section as in claim 1, wherein the bamboo slices in Step (1) are made by rotary slicing of assembled laminated bamboo material.

4. The method of making bamboo-surfaced layered Venetian blind slats having a curved cross-section as in claim 1, wherein the bamboo slices in Step (1) are made by plain slicing of assembled laminated bamboo material.

5. The method of making bamboo-surfaced layered Venetian blind slats having a curved cross-section as in claim 1, wherein the filling slices in Step (2) are fast growing wood slices or bamboo slices.

6. The method of making bamboo-surfaced layered Venetian blind slats having a curved cross-section as in claim 1, wherein the adhesive in Step (3) is wood glue.

7. The method of making bamboo-surfaced layered Venetian blind slats having a curved cross-section as in claim 1, wherein the repeating curved shape of the pressing surfaces in Step (4) is an arc.

8. The method of making bamboo-surfaced layered Venetian blind slats having a curved cross-section as in claim 1, wherein the repeating curved shape of the pressing surfaces in Step (4) is a wavy curve.

9. The method of making bamboo-surfaced layered Venetian blind slats having a curved cross-section as in claim 1, wherein the cross-section of the bamboo surfaced layered Venetian blind slats in Step (6) is arc-shaped.

10. The method of making bamboo-surfaced layered Venetian blind slats having a curved cross-section as in claim 1, wherein the cross-section of the bamboo surfaced layered Venetian blind slats in Step (6) is wave-shaped.

* * * * *